Figure 1:
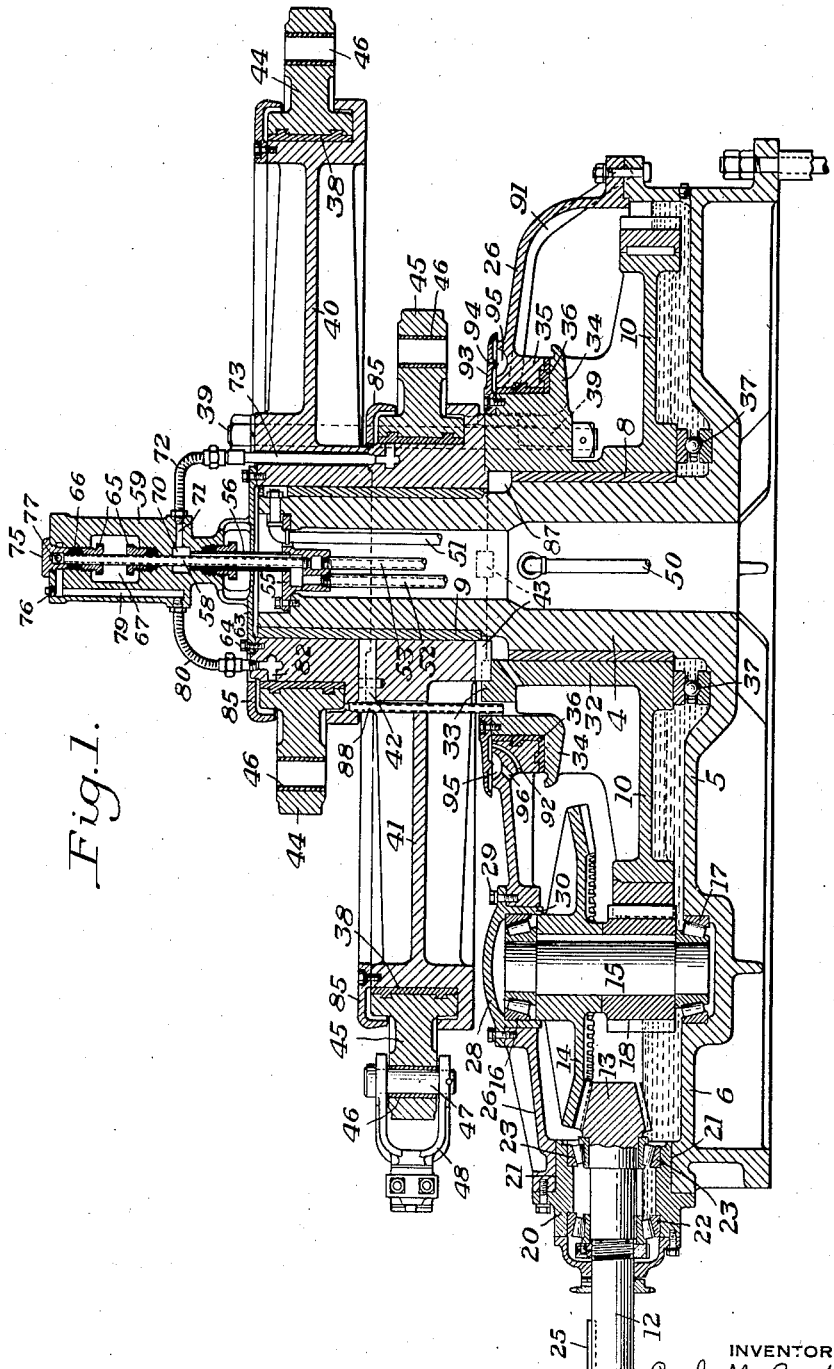

May 22, 1934.  C. M. ANDERSON  1,959,806
PUMPING POWER
Filed Jan. 6, 1932   2 Sheets-Sheet 1

INVENTOR
Carl M. Anderson
by
Byrnes, Stebbins, Parmelee & Blenko
his attorneys

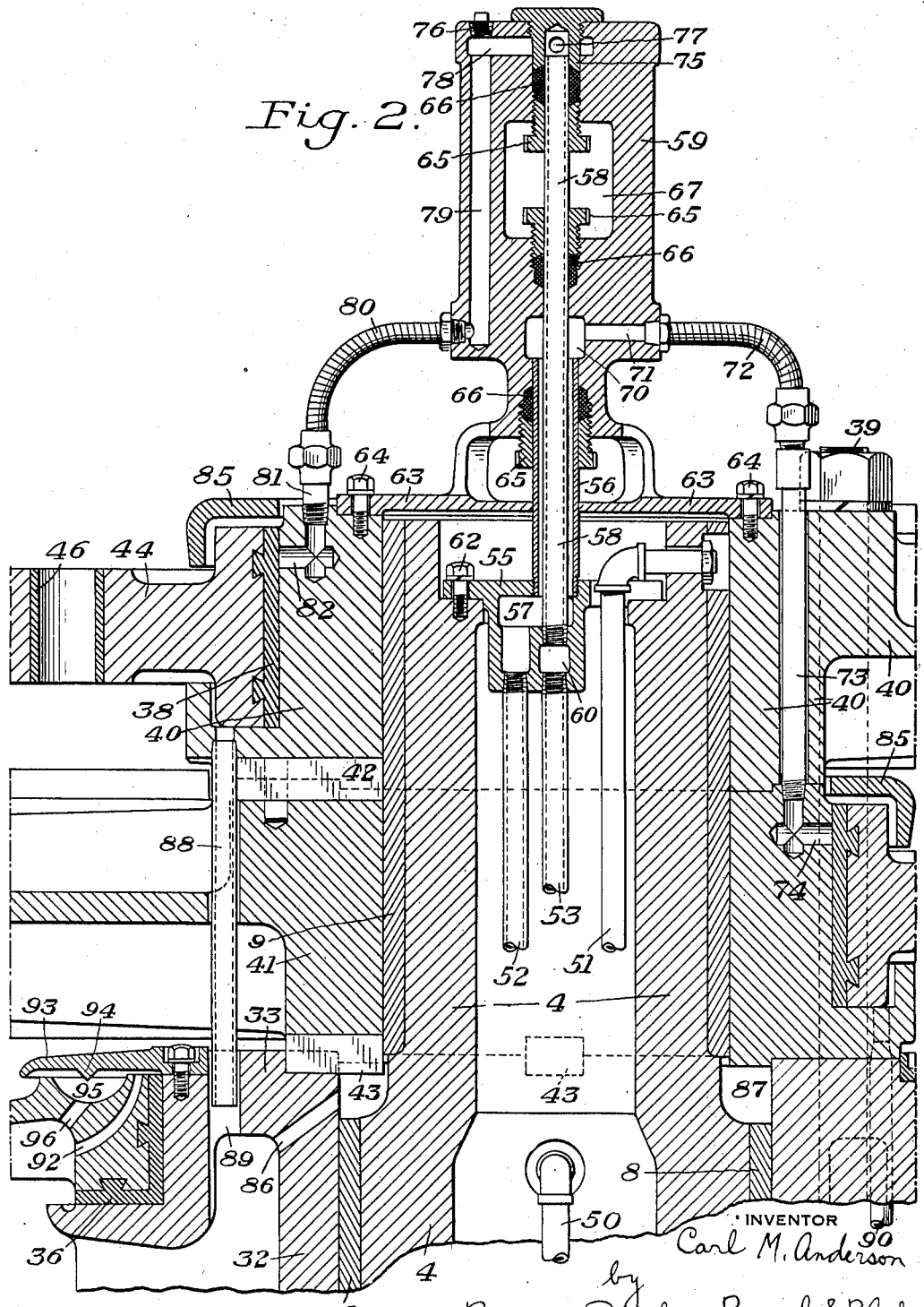

Patented May 22, 1934

1,959,806

UNITED STATES PATENT OFFICE 1,959,806

PUMPING POWER

Carl M. Anderson, Oil City, Pa., assignor to Oil Well Supply Company, Oil City, Pa., a corporation of New Jersey Application January 6, 1932, Serial No. 584,979

17 Claims. (Cl. 74—14)

My invention relates to a pumping power to be used for the purpose of pumping a number of wells. More particularly, my invention relates to gearing for driving such a pumping power, and such provision for lubricating the gearing and the bearings of the power as will insure long life of the mechanism.

Pumping powers have been used extensively in the field; and the greater portion of these powers have been belt driven. That is, a large band wheel which is belt driven is connected to the eccentrics of the pumping power to rotate the same. Inasmuch as the band wheel may measure as large as thirty feet in diameter, considerable expense is incurred in erecting a building to protect the power from the elements.

I have provided a simple form of driving mechanism for rotating the eccentrics of a pumping power whereby the bearings and gearing may be housed in a casing. This does away with the expense of a building for protecting the power, and makes it possible to assemble the power at the manufacturing plant. When the assembled power is shipped to the place of operation, all that is necessary is to connect a projecting stub shaft to the prime mover and connect the clevises of the pull rods to the eccentric straps.

In the drawings, in which merely for illustrating my invention and not as limiting the same I have shown one embodiment which the invention may assume, Fig. 1 is a view in central vertical section of such a pumping power, and Fig. 2 is a section showing a portion of the mechanism shown in Fig. 1 on an enlarged scale.

When the pumping power is shipped into the field, the entire mechanism, save the driving motor, is supported by one base. For purposes of simplicity, and to prevent leakage of lubricant, I form a central column 4 integrally with an oil pan 5. The oil pan 5 is extended, as shown at 6, so as to provide an oil bath for portions of the driving mechanism for the power.

The central column 4 is surrounded by a lower bushing 8 and an upper bushing 9; and since the upper portion of the column is of smaller diameter than the lower portion, the bushing 9 is of less diameter than the bushing 8. These bushings 8 and 9 provide bearings for the parts which rotate about the axis of the central column. A gear ring 10 is journaled on the bushing 8; and is driven through reduction gearing as follows: A pinion shaft 12 carries at its inner end a pinion 13 which meshes with a bevel gear 14. This bevel gear 14 is keyed to a vertically arranged stub shaft 15 which is rotatably mounted in upper and lower bearings 16 and 17 respectively. A pinion 18 is keyed to the lower end of the stub shaft 15 and meshes with the teeth on the periphery of the gear ring 10 so as to drive the pumping power.

The oil pan 5 with its extension 6 provide a bath of lubricant in which lower portions of the gear ring 10 and the pinion 18 rotate. This provides ample lubrication for these rotating parts of the driving mechanism for the power. The pinion 13 dips into the bath of lubricant and splashes oil on to the bevel gear 14.

A cage 20 is received within an opening 21 in the extension 6 of the oil pan. This cage carries the spaced roller bearings 22 and 23 in which the pinion shaft 14 is rotatably mounted. The lower portions of these roller bearings 22 and 23 are below the level of the bath of lubricant in the extension 6; and, therefore, these roller bearings are amply supplied with lubricant. It will be noted that the opening 21 is of larger diameter than the pinion 13. Therefore, the entire assemblage of cage, pinion shaft and pinion may be removed from the opening 21 as a unit. The outer end of the pinion shaft 12 carries a key-way within which a key 25 may be inserted for keying the pinion shaft to suitable driving means, such as a coupling to a prime mover.

A cover 26 cooperates with the pan 5 and extension 6 to house the gear ring 10 and the reduction gearing which drives the same. This cover extends over the reduction gearing and overlies the cage 20. As above mentioned, the opening 21 is large enough to permit withdrawal of the pinion 13; and, therefore, the cover 26 need not be removed in order to permit withdrawal of the assemblage of pinion shaft 12 and pinion 13. A cap 28 protects the upper end of the stub shaft 15, this cap being secured over the opening by screws 29. The cap has an annular depending flange 30 which surrounds and carries one of the races of the upper roller bearing 16.

The upper portion of the hub 32 of the gear ring 10 is enlarged as shown at 33. This enlarged portion carries, furthermore, a radial extending flange 34 which underlies a bearing portion 35 on the cover 26. This bearing portion 35 is provided with Babbitt bearings 36 which are in bearing contact with the periphery of the enlarged portion 33 and with the upper face of the flange 34. A roller bearing 37 is disposed between the hub 32 and the pan 5. It will be understood, therefore, that thrusts by the gear ring 10 in a downwardly direction will be taken by the ball bearing 37, and thrusts in an upwardly direction will be taken by the bearing portion 35 of the cover 26.

Eccentrics 40 and 41 are rotatably mounted on the bushing 9. These eccentrics are secured for rotation together by a key 42; and the gear ring 10 is secured to the eccentric 41 by a key 43. Bolts 39 extend through the eccentrics 40 and 41 and the enlarged portion 33 of the hub 32. In this manner the eccentrics are caused to rotate together, and are driven from the pinion shaft 12, a portion of which projects from the cage 20. The eccentric 40 carries a strap 44, and the eccentric 41 carries a strap 45, each of these straps being provided on its inner face with a Babbitt bearing 38. Each strap is provided with a plurality of bores; and in each bore is inserted a bushing 46. These bushings 46 take up the wear of the pins 47 by means of which the clevises 48 are connected to the straps. Through the various clevises 48 the pull rods are actuated for pumping the various wells.

In similar fashion, as disclosed in the copending application of Edgar E. Greve, Serial No. 527,439, filed April 3, 1931, I provide a separate force-feed pump located outside of the power for delivering lubricant under pressure to the various bearings of the eccentrics. Conduits 50 and 51 conduct lubricant from the force-feed pump to the bearing bushings 8 and 9 respectively. Conduits 52 and 53 extend vertically within the hollow column 4 and are threaded into the bottom of a manifold 55. This manifold is located within the hollow column 4 below the top thereof. A pipe 56 extends vertically from the top of the manifold 55, the interior of this pipe being in communication with a chamber 57 in the manifold to which lubricant is supplied by the conduit 52. The pipe 56 surrounds a smaller pipe 58 which extends vertically from the manifold 55 to the upper portion of the housing 59 of a stuffing box. The lower end of the pipe 58 communicates with a chamber 60 to which lubricant is supplied by the conduit 53. Since the coaxial pipes 56 and 58 are threaded into the manifold 55, and the manifold 55 is secured by screws 62 to the upper portion of the central column 4, these elements are stationary. The stuffing box housing 59 is provided with a lower flange 63 which projects radially over the top of the central column 4 and rests upon the upper eccentric 40. The flange 63 is secured to the eccentric 40 by screws 64; and accordingly, the housing 59 rotates with the eccentrics. Gland nuts 65 cooperate with packing 66 for preventing leakage of lubricant along the pipes 56 and 58. The housing 59 is provided with an opening 67 so that one may have access to the gland nuts 65 to adjust the same.

The lower portion of the housing 59 is provided with a chamber 70 to which lubricant is delivered by the pipe 56. Lubricant flows from this chamber 70 through a passage 71 and a hose connection 72 to a vertical pipe 73. A port 74 discharges lubricant from the lower end of the pipe 73 to the bearing between the strap 45 and the eccentric 41.

A gland nut 75 extends downwardly through the top of the housing 59 in alignment with the pipe 58. The nut is provided with a central bore extending part-way through the nut along the axis of the same; and the upper end of the pipe 58 is received within this bore. The lower rim of the nut 75 cooperates with packing 66 to form a seal around the upper end of the pipe 58. A lateral port 77 in the nut 75 communicates with a passage 78 in the housing 59; and accordingly, lubricant passing upwardly through the conduit 53 and pipe 58 is discharged through port 77 into the passage 78. A plug 76 is removable from a filling opening in the housing 59. Through this opening any air entrapped in the passage 78 may be vented. Moreover, through this opening the lubricant conduit 53 and the passageway supplied thereby may be primed when first starting the lubricating system. A downwardly leading passage 79 conveys the lubricant to a hose connection 80 through which the lubricant flows to a nipple 81. A port 82 discharges the lubricant from the lower end of the nipple 81 to the bearing between the eccentric 40 and the strap 44.

The flange 63 on the bottom of the housing 59 protects the hollow column and the manifold 55 contained within the top thereof from dirt and foreign material. The bearings between the eccentrics and the straps are protected by dust covers 85 which are carried by the eccentrics.

The lubricant supplied through the conduits 50, 51, 52 and 53 passes first to the several bearings of the power and is then returned to the oil bath in the pan 5. Lubricant passing downwardly within the hub 32 is delivered directly to the bath of lubricant. If some of this lubricant should overflow the top of the bearing bushing 8, it is discharged through ports 86, and thus makes its way back to the bath. Oil flowing downwardly along the bushing 9 collects in the annular chamber 87 from which it discharges through the ports 86. The excess of lubricant supplied to the bearing between the strap 44 and the eccentric 40 is discharged downwardly through a pipe 88 and through an opening 89 in the enlarged portion 33 of the hub 32. In this way, this excess lubricant makes its way back to the bath. A similar pipe shown in dotted lines at 90 discharges excess lubricant from the bearing between the strap 45 and the eccentric 41.

Lubricant for the bearing portion 35 is supplied through a conduit 91 (see Fig. 1). If any oil accumulates on top of the bearing portion 35, it will pass outwardly through ports 92. If, instead of accumulating on top of the portion 35, this excess lubricant is caught up by the revolving cover plate 93, the lubricant strikes a projecting rib 94 and is thrown into a trough 95 from which it makes its way through ports 96 into the bath of lubricant.

From the above it will be noted that all excess lubricant drains to the bath in the pan 5. From this bath the lubricant is returned to the pump reservoir; and the force-feed pump forces lubricant from this pump reservoir back through the conduits 50, 51, 52, 53 and 91. My improved mechanism, therefore, provides for continuous lubrication of the bearings.

Certain advantages of my invention follow from the simplicity of the construction which renders the building of a shelter for the power unnecessary. The housing of the driving mechanism for the rotary offers a considerable advantage inasmuch as the power may be set up in the open and connected to a prime mover for continuous operation in this condition, and without a shelter.

The lubricating system afforded by my improved construction has the advantage that the bearings are effectually protected from foreign material such as grit. Moreover, the continuous circulation of lubricant insures that the parts will operate with as little friction as possible, and will continue in service for a long period without excessive wear.

My improved mechanism is compactly arranged, and may be shipped as a unit into the field, this being of particular advantage, since it does not require the services of skilled machinists in setting up the power for operation in the field.

Moreover, the assemblage of the cage 20, the pinion shaft 12 and the bearings 22 and 23 may be easily removed from the opening 21 as a unit. Further advantages have been pointed out in the course of the above description.

While I have illustrated and described one specific form of pumping power, it is to be understood that the invention is not restricted to the particular construction and arrangement shown, but may be variously modified within the contemplation of the invention and under the scope of the following claims.

I claim:

1. A pumping power comprising a central column having integrally formed therewith an oil pan, eccentrics mounted for rotation about the axis of the column above said oil pan, and a gear ring journaled on said column for driving said eccentrics, said ring being journaled on said column adjacent said oil pan and below said eccentrics whereby said ring may be lubricated by lubricant placed in said pan.

2. A pumping power comprising a central column having formed integrally therewith an oil pan, eccentrics mounted for rotation about the axis of said column above said oil pan, and means for driving said eccentrics comprising a gear ring journaled on the column below said eccentrics and reduction gearing operatively connected to said gear ring for rotating the same, said ring being journaled on said column adjacent said oil pan and said reduction gearing being so mounted as to permit portions thereof to take up lubricant placed in said pan.

3. A pumping power comprising a fixed central column and a supporting base therefor, eccentrics mounted for rotation about said column as an axis, a gear ring journaled on said column below said eccentrics, and a casing covering said gear ring and providing a bearing engaging a portion of the hub of said gear ring for maintaining the latter in position.

4. A pumping power comprising a fixed central column and a supporting base therefor, eccentrics mounted for rotation about the column as an axis, a gear ring for driving said eccentrics journaled on said column below said eccentrics, said gear ring having a hub portion provided with a radially projecting flange, and a casing for covering said ring, said casing being provided with a bearing portion surrounding the hub on the gear ring and resting on the radial flange thereof.

5. A pumping power comprising a fixed hollow central column and a supporting base therefor, eccentrics mounted for rotation about the column as an axis, and means for individually lubricating said eccentrics comprising conduits extending vertically within the hollow column, a stuffing box, and means for supplying lubricant from the stuffing box to lubricate the eccentrics, said stuffing box including a housing having a flange secured to an eccentric to rotate therewith.

6. A pumping power comprising a hollow central column, eccentrics mounted for rotation about the axis of the column, and means for lubricating said eccentrics comprising means for conducting lubricant vertically within the column, a stuffing box for receiving lubricant therefrom, and means for supplying lubricant from the stuffing box to the eccentrics, said stuffing box including a housing provided with a radial extending flange overlying the top of the column and secured to an eccentric so as to rotate therewith.

7. A pumping power comprising a base and a fixed vertical central column mounted thereon, eccentrics mounted for rotation about said column as an axis, a gear ring disposed below said eccentrics and secured to the eccentrics to rotate therewith, said gear ring having a portion of enlarged diameter carried by the upper portion of its hub, means for driving said gear ring, and a casing overlying said gear ring and providing a bearing for said portion of enlarged diameter.

8. A pumping power comprising a supporting base and a fixed vertical central column thereon, eccentrics mounted for rotation about said column as an axis, a gear ring journaled on said column below said eccentrics for driving said eccentrics, and a casing for covering said gear ring, said casing being provided with a thrust bearing for taking upward thrust of the gear ring.

9. A pumping power comprising a supporting base and a fixed vertical central column thereon, eccentrics mounted for rotation about said column as an axis, a gear ring journaled on said column below said eccentrics, thrust bearings above and below said gear ring and adjacent thereto, a stub shaft having its axis extending vertically, a pinion on the lower end of said shaft meshing with the gear ring, and gearing for driving said stub shaft.

10. A pumping power comprising a supporting base and a fixed vertical central column thereon, eccentrics mounted for rotation about said column as an axis, a gear ring journaled on the column below said eccentrics, and thrust bearings above and below said gear ring and adjacent thereto, one for taking upward thrust and the other for taking downward thrust of said gear ring.

11. A pumping power comprising a supporting base and a fixed vertical central column thereon, providing a lower bearing of relatively larger diameter and an upper bearing of relatively smaller diameter, eccentrics rotatably mounted on said smaller bearing and a gear ring rotatably mounted on said larger bearing for driving said eccentrics.

12. A pumping power comprising a supporting base and a fixed vertical central column thereon, eccentrics mounted for rotation about said column as an axis, a gear ring journaled on the column below said eccentrics for driving the eccentrics, a casing for covering the gear ring, said casing providing a bearing for the hub of the gear ring, and a dust cap overlying said bearing and attached to said gear ring.

13. A pumping power comprising a supporting base and a fixed vertical central column thereon, eccentrics mounted for rotation about said column as an axis, a gear ring journaled on the column below said eccentrics for driving the eccentrics, a casing for covering the gear ring, said casing providing a bearing for the hub of the gear ring, and a dust cap overlying said bearing, said casing providing discharge ports located outside of said bearings for returning lubricant overflowing said bearing to the chamber within the casing.

14. A pumping power comprising a hollow central column, eccentrics mounted for rotation about said column as an axis and means for lubricating said eccentrics comprising a manifold disposed within the hollow column and below the top thereof, concentric pipes extending vertically from said manifold, a stuffing box for receiving lubricant from said vertical pipes, and separate conduits for supplying lubricant from the stuffing box individually to the eccentrics.

15. In a pumping power, a central column, eccentrics mounted for rotation about said column as an axis, a gear ring journaled on said column below said eccentrics, a vertical stub shaft having a pinion at its lower end for driving said gear ring, a casing enclosing said ring and pinion and in which said stub shaft is journaled, beveled gearing for rotating said stub shaft, a horizontal shaft carrying one of the beveled gears and a cage providing spaced bearings for said horizontal shaft.

16. An oil pumping power comprising a central column having an oil pan integrally formed therewith, a gear wheel mounted for rotation about the axis of said column above said oil pan, eccentrics mounted for rotating about the axis of said column above said gear wheel, keys between said wheel and said eccentrics, and bolts for tying said eccentrics and gear wheel together.

17. The combination of claim 16 in which said keys are placed radially in horizontal planes between the gear wheel and one eccentric and between said eccentric and the other eccentric.

CARL M. ANDERSON.